United States Patent
Chen et al.

(10) Patent No.: US 8,712,399 B2
(45) Date of Patent: Apr. 29, 2014

(54) COORDINATED MULTI-POINT TRANSMISSION IN A CELLULAR NETWORK

(75) Inventors: Runhua Chen, Dallas, TX (US); Eko Nugroho Onggosanusi, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/773,491

(22) Filed: May 4, 2010

(65) Prior Publication Data
US 2010/0285792 A1  Nov. 11, 2010

Related U.S. Application Data

(60) Provisional application No. 61/176,011, filed on May 6, 2009.

(51) Int. Cl.
*H04W 4/00* (2009.01)

(52) U.S. Cl.
USPC ............ 455/422.1; 455/450; 455/452.2; 370/329; 370/341; 370/535

(58) Field of Classification Search
USPC ........ 455/422.1, 435.1, 450, 451, 452.1, 455/452.2, 453, 458, 464, 509, 515, 524, 455/525, 550.1, 560, 561; 370/310, 312, 370/315, 320, 322, 326, 328–330, 335, 336, 370/341–345, 432, 491, 500, 535; 375/260, 375/267

See application file for complete search history.

(56) References Cited

U.S. PATENT DOCUMENTS

| 6,925,067 | B2 * | 8/2005 | Jou ............................... 370/329 |
| 8,059,735 | B2 * | 11/2011 | Shen et al. .................... 375/260 |
| 2008/0188228 | A1 * | 8/2008 | Pecen et al. ................... 455/449 |
| 2008/0192660 | A1 * | 8/2008 | Li et al. ......................... 370/294 |
| 2010/0056170 | A1 * | 3/2010 | Lindoff et al. ............. 455/452.1 |
| 2010/0104034 | A1 * | 4/2010 | Nam et al. ..................... 375/260 |
| 2010/0177746 | A1 * | 7/2010 | Gorokhov et al. ............ 370/336 |
| 2010/0260059 | A1 * | 10/2010 | Zhang et al. .................. 370/252 |
| 2010/0272032 | A1 * | 10/2010 | Sayana et al. ................. 370/329 |
| 2010/0273506 | A1 * | 10/2010 | Stern-Berkowitz et al. ......................... 455/456.1 |

OTHER PUBLICATIONS

U.S. Appl. No. 12/690,412, filed Jan. 20, 2010, "Circuit and Method for Mapping Data Symbols and Reference Signals for Coordinated Multi-Point Systems", pp. 1-28.
Stefan Parkvall and David Astely, "The Evolution of LTE towards IMT-Advanced", Journal of Communications, vol. 4, No. 3, Apr. 2009, pp. 146-154.

\* cited by examiner

*Primary Examiner* — Mahendra Patel
(74) *Attorney, Agent, or Firm* — Ronald O. Neerings; Wade James Brady; Frederick J. Telecky, Jr.

(57) ABSTRACT

Coordinated multi-point (CoMP) transmissions in a cellular network is performed using multi-broadcast single frequency network (MBSFN) subframes. During CoMP transmission, demodulation reference signals (DRS) are placed in the one portion the MDSFN subframe, while cell-specific reference signals (CRS) are placed in a separate portion of the MDSFN subframe. Therefore, no CRS-DRS collision will occur during CoMP transmission.

3 Claims, 3 Drawing Sheets

COORDINATED MULTI-POINT TRANSMISSION IN A CELLULAR NETWORK

CLAIM TO PRIORITY UNDER 35 U.S.C. 119

The present application claims priority to and incorporates by reference U.S. provisional application No. 61/176,011 filed on May 6, 2009, entitled "Configuration of Coordinated Multi-Point Transmission (COMP) in MBSFN Subframe."

FIELD OF THE INVENTION

This invention generally relates to wireless cellular communication, and in particular to multi-point transmission in orthogonal and single carrier frequency division multiple access (OFDMA) (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can be portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Long Term Evolution (LTE) wireless networks, also known as Evolved Universal Terrestrial Radio Access (E-UTRA), are being standardized by the 3GPP working groups (WG). OFDMA and SC-FDMA (single carrier FDMA) access schemes were chosen for the down-link (DL) and up-link (UL) of E-UTRA, respectively. User Equipments (UE's) are time and frequency multiplexed on a physical uplink shared channel (PUSCH), and a fine time and frequency synchronization between UE's guarantees optimal intra-cell orthogonality. In case the UE is not UL synchronized, it uses a non-synchronized Physical Random Access Channel (PRACH), and the Base Station provides back some allocated UL resource and timing advance information to allow the UE to transmit on the PUSCH. The general operations of the physical channels are described in the EUTRA specifications, for example: "$3^{rd}$ Generation Partnership Project; Technical Specification Group Radio Access Network; Evolved Universal Terrestrial Radio Access (E-UTRA); Physical Channels and Modulation (TS 36.211 Release 8, or later)."

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DRS. Note that RS can also be transmitted for other purposes, such as channel sounding (SRS), synchronization, or any other purpose. Also note that Reference Signal (RS) can be sometimes called the pilot signal, or the training signal, or any other equivalent term.

The LTE PHY can optionally exploit multiple transceivers at both the base station and UE in order to enhance link robustness and increase data rates for the LTE downlink. Spatial diversity can be used to provide diversity against fading. In particular, maximal ratio combining (MRC) is used to enhance link reliability in challenging propagating conditions when signal strength is low and multipath conditions are challenging. Transmit diversity can be used to improve signal quality by transmitting the same data from multiple antennas to the receiver. Spatial multiplexing can be used to increase system capacity by carrying multiple data streams simultaneously from multiple antennas on the same frequency. Spatial multiplexing may be performed with one of the following cyclic delay diversity (CDD) precoding methods: zero-delay, small-delay, or large-delay CDD. Spatial multiplexing may also be referred to as MIMO (multiple input multiple output).

With MRC, a signal is received via two (or more) separate antenna/transceiver pairs. The antennas are physically separated, and therefore have distinct channel impulse responses. Channel compensation is applied to each received signal within the baseband processor before being linearly combined to create a single composite received signal. When combined in this manner, the received signals add coherently within the baseband processor. However, the thermal noise from each transceiver is uncorrelated, resulting in improved signal to noise ratio (SNR). MRC enhances link reliability, but it does not increase the nominal system data rate since data is transmitted by a single antenna and is processed at the receiver via two or more receivers. MRC is therefore a form of receiver diversity rather than more conventional antenna diversity.

MIMO, on the other hand, does increase system data rates. This is achieved by using multiple antennas on both the transmitting and receiving ends. In order to successfully receive a MIMO transmission, the receiver must determine the channel impulse response from each transmitting antenna. In LTE, channel impulse responses are determined by sequentially transmitting known reference signals from each transmitting antenna. While one transmitter antenna is sending the reference signal, the other antenna is idle. Once the channel impulse responses are known, data can be transmitted from both antennas simultaneously. The linear combination of the two data streams at the two receiver antennas results in a set of two equations and two unknowns, which is resolvable into the two original data streams.

Three different types of physical channels are defined for the LTE downlink. One common characteristic of physical channels is that they all convey information from higher layers in the LTE stack. This is in contrast to physical signals, which convey information that is used exclusively within the PHY layer. Currently, the LTE DL physical channels are as follows: Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), and Physical Hybrid ARQ Indicator Channel (PHICH).

Physical channels are mapped to specific transport channels. Transport channels are SAPs for higher layers. Each physical channel has defined algorithms for bit scrambling, modulation, layer mapping, CDD precoding, and resource element assignment. Layer mapping and precoding are related to MIMO applications. Basically, a layer corresponds to a spatial multiplexing channel. Channel rank can vary from one up to the minimum of number of transmit and receive antennas. For example, given a 4×2 system, i.e., a system having four transmit antennas and two receive antennas, the maximum channel rank is two. The channel rank associated with a particular connection varies in time and frequency as the fast fading alters the channel coefficients. Moreover, the channel rank determines how many layers, also referred to as the transmission rank, can be successfully transmitted simultaneously. For example, if the channel rank is one at the instant of the transmission of two layers, there is a strong likelihood that the two signals corresponding to the two layers will interfere so much that both of the layers are erroneously detected at the receiver. In conjunction with precoding, adapting the transmission to the channel rank involves striving to use as many layers as the channel rank. The precoding applied for the demodulation reference signal (DMRS) is the same as the one applied for the PUSCH (for uplink) and PDSCH (for downlink). Cyclic shift separation is the primary multiplexing scheme of the demodulation reference signals.

The baseline for sounding reference signal in LTE-Advanced operation is non-precoded and antenna-specific. For multiplexing of the sounding reference signals, Rel-8 or later principles are reused.

MIMO systems are defined in terms of M-transmitters×N-receivers. For LTE, defined configurations are M=1, 2, and 4 while the value of N is not specified. When M>N, there is redundancy on at least one of the data streams. Layer mapping specifies exactly how the extra transmitter antennas are employed.

Precoding is also used in conjunction with spatial multiplexing. MIMO exploits multipath to resolve independent spatial data streams. In other words, MIMO systems require a certain degree of multipath for reliable operation. In a noise-limited environment with low multipath distortion, MIMO systems can actually become impaired. The basic principle involved in precoding is to mix and distribute the modulation symbols over the antennas while potentially also taking the current channel conditions into account. Precoding can be implemented by, for example, multiplying the information carrying symbol vector containing modulation symbols by a matrix which is selected to match the channel based on a certain selection criterion. Some examples of selection criterion include average throughput and maximum signal-to-interference-noise ratio (SINR). Sequences of symbol vectors thus form a set of parallel symbol streams and each such symbol stream is referred to as a "layer". Thus, depending on the choice of precoder in a particular implementation, a layer may directly correspond to a certain physical antenna or a layer may, via the precoder mapping, be distributed onto several physical antennas.

The provisioning of broadcast/multicast services in a mobile communication system allows the same information to be simultaneously provided to a large number of UE dispersed over a large area corresponding to a large number of cells. In order to improve reception of broadcast information, UE at the cell edge can utilized the received power from multiple broadcast transmissions emanating from multiple cells. One way to achieve this is to ensure that the broadcast transmissions from different cells are truly identical and transmitted mutually time-aligned. Under these conditions, the transmissions received by the UE from multiple cells will appear as a single transmission subject to severe multi-path propagation. The transmission of identical time-aligned signals from multiple cells, especially when utilized to provide broadcast/multicast services, is sometimes referred to as Single-Frequency-Network (SFN) operation or Multicast-Broadcast Single Frequency Network (MBSFN) operation using the Physical Multicast Channel (PMCH).

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

LTE-Advanced (Release-10) (LTE-A) aims to achieves 3-4 times higher data rate and spectral efficiency compared to LTE Rel-8 network. Advanced downlink MIMO (multiple input multiple output) transmission schemes are seen necessary in order to achieve this objective.

Coordinated Multiple Point (CoMP) transmission has been proposed as a promising technology to meet the spectral efficiency requirement in Rel-10. As opposed to conventional cellular network where a single UE receives data transmission from a single eNB at a time, multiple eNBs may coordinately design the downlink transmission to a UE simultaneously on the same frequency resources. In order to reduce the DRS overhead and assist PDSCH demodulation, DRS from different CoMP transmission points should be configured in the same time/frequency resources. In other words, the same frequency domain offset of DRS should be used at different CoMP transmission points. In order to avoid resource conflicts, embodiments of the present invention may perform CoMP transmission using multi-broadcast single frequency network (MBSFN) subframes, as will be described in more detail herein.

The basic idea of CoMP is to extend the conventional "single cell-multiple UEs" system structure to a "multiple cells-multiple UEs" network topology so that the concept of cell edge UE would give way to that of a UE in the vicinity of cell boundaries being at the center area of a "super-cell" consisting multiple cells. Hence, UEs in CoMP communication mode will get much better service and boosted SNR if several nearby cells work in cooperation, where the involved cells are called CoMP cooperating cells.

Figure 1:
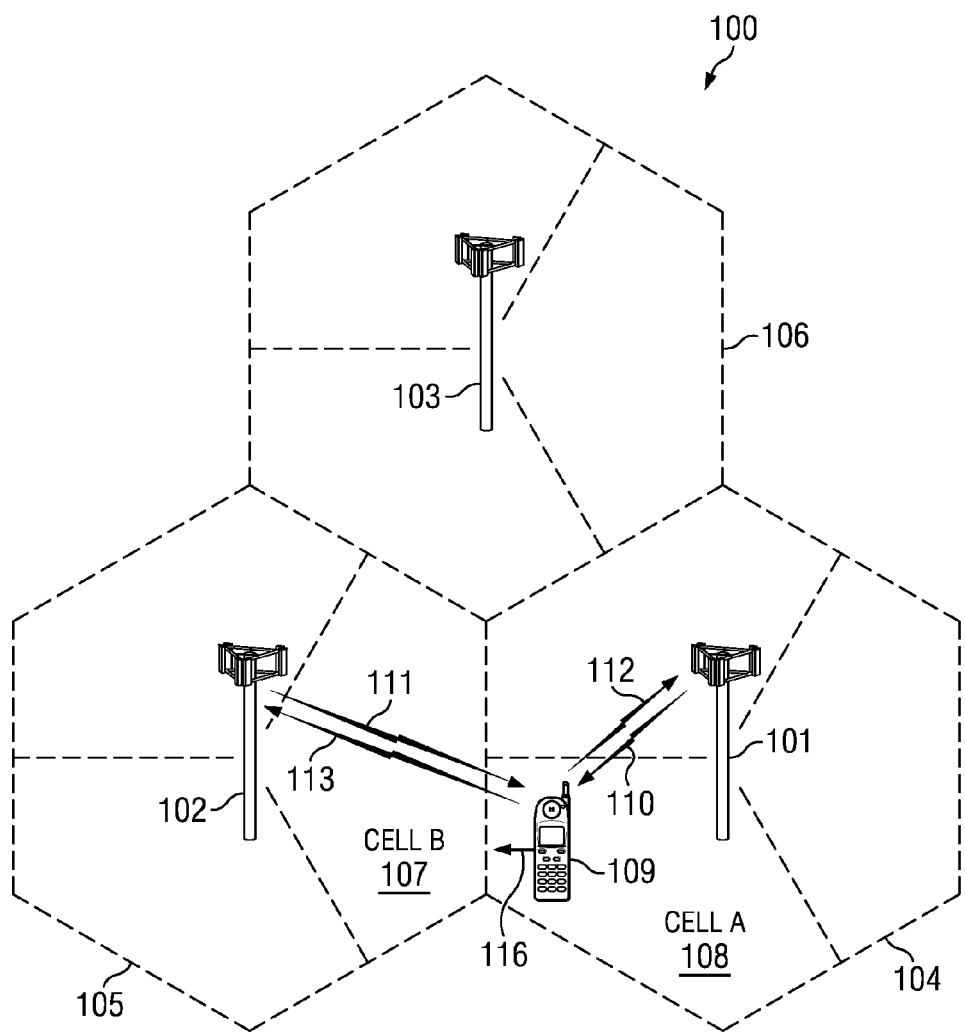
FIG. 1 is a pictorial of an illustrative telecommunications network that supports that supports transmission and reception of CoMP transmission signals.

FIG. 1 shows an illustrative wireless telecommunications network 100 that supports transmission and reception of CoMP transmission signals, as described in more detail below. The illustrative telecommunications network includes eNBs 101, 102, and 103, though in operation, a telecommunications network may include many more eNBs or fewer eNBs. Each of eNB 101, 102, and 103 is operable over corresponding coverage areas 104, 105, and 106. Each eNB's coverage area is further divided into cells. In the illustrated network, each eNB's coverage area is divided into three cells. Handset or other UE 109 is shown in Cell A 108, which is within coverage area 104 of eNB 101. However, CoMP transmission is occurring and both eNB 101 and 102 are transmitting to and receiving transmissions from UE 109 via downlink channels 110, 111 respectively and uplink channels 112, 113 respectively. As UE 109 moves 116 out of Cell A 108, and into Cell B 107, UE 109 may be "handed over" to eNB 102, however eNB 101 and 102 both continue to provide CoMP transmission to UE 109 while it remains close to the cell edge. While transmitting in CoMP MIMO mode, formation of DRS for each antenna according to embodiments of the invention will be described in more detail below.

When UE 109 is not up-link synchronized with eNB 101, non-synchronized UE 109 employs non-synchronous random access (NSRA) to request allocation of up-link 112 time or frequency or code resources. If UE 109 has data ready for transmission, for example, traffic data, measurements report, tracking area update, etc., UE 109 can transmit a random access signal on up-link 112 to eNB 101. The random access signal notifies eNB 101 that UE 109 requires up-link resources to transmit the UE's data. ENB 101 responds by transmitting to UE 109, via down-link 110, a message containing the parameters of the resources allocated for UE 109 up-link transmission along with a possible timing error correction. After receiving the resource allocation and a possible timing adjustment message transmitted on down-link 110 by eNB 101, UE 109 may adjust its transmit timing, to bring the UE 109 into synchronization with eNB 101, and transmit the data on up-link 112 employing the allotted resources during the prescribed time interval.

When UE 109 is close to a cell boundary, eNB 101 also coordinates with eNB 102 via a backhaul interconnecting network to determine which resource to allocate to UE 109 so that both eNBs can cooperate to transmit in CoMP manner. Once the UE is synchronized, the eNB may both simultaneously send data on DL in MIMO mode to UE 109.

The current E-UTRA (LTE Rel 8) specification supports up to I-layer beamforming on antenna port 5. The eNB applies beamforming on its transmit antenna array. The beamforming vector is selected by the eNB and is transparent to the UE, i.e., eNB does not explicitly signal the beamforming vector to UE via DL control signal. To enable channel estimation and data demodulation, dedicated reference signals need to be transmitted. A dedicated demodulation reference symbol (DRS) is to be precoded by the same precoding vector applied to PDSCH data which enables UE to estimate the effective downlink channel for demodulation. The same beamforming vector is applied to both DRS and 1-layer PDSCH.

Figure 2:
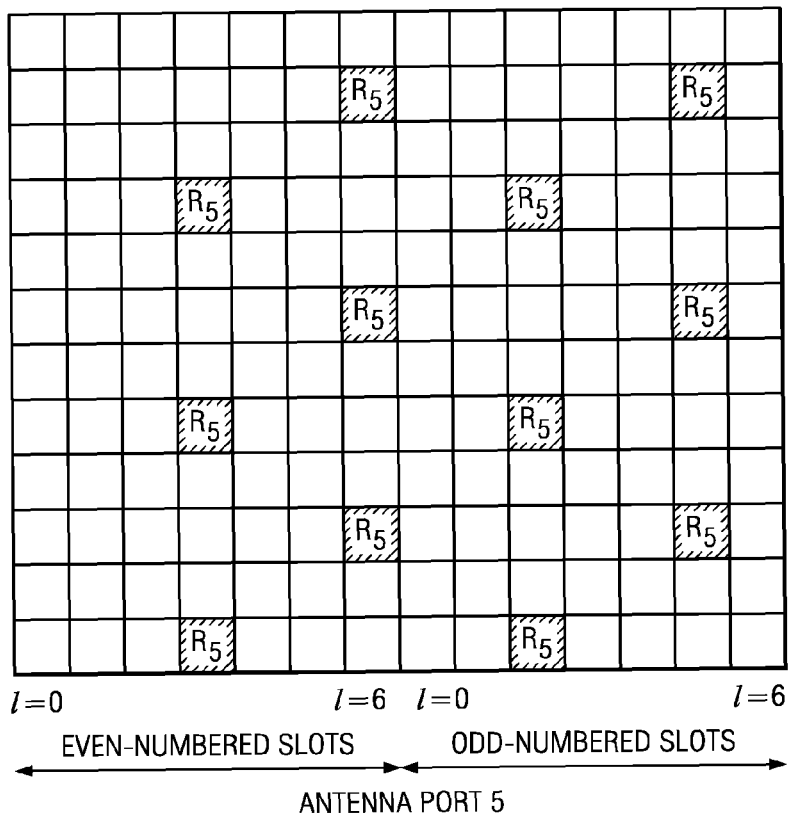
FIG. 2 illustrates a resource block with DRS patterns for a normal CP.
Figure 3:
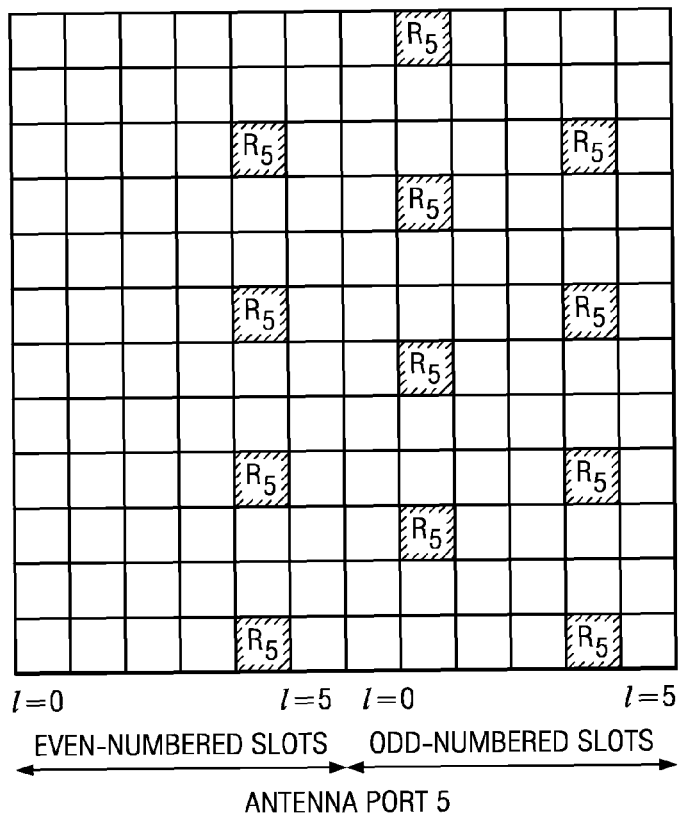
FIG. 3 illustrates a resource block with DRS patterns for an extended CP.

As mentioned, the current LTE Rel. 8 supports single-stream (1-layer) beamforming on antenna port 5. The current DRS patterns for LTE Rel. 8 for normal CP and extended CP are illustrated in FIGS. 2 and 3, respectively. FIG. 2 illustrates a resource block (RB) with a normal CP; each RB has 12 DRS symbols ($R_s$), distributed in 4 OFDM symbols where each OFDM symbol has 3 DRS. FIG. 3 illustrates extended CP; each RB has 12 DRS symbols, distributed in 3 OFDM symbols where each OFDM symbol has 4 DRS. The 12 DRS symbols within the RB supporting beamforming on antenna port 5 are demodulation reference symbols for the single-layer PDSCH transmission in the RB.

Non-codebook based precoding is an effective technique for supporting CoMP transmission in LTE-A. Compared to codebook-based precoding where precoding matrices is selected from a finite set of pre-defined matrices (codebook), precoding matrices used in non-codebook precoding can be chosen arbitrarily and therefore is more flexible to achieve the precoding gain. To enable a UE to estimate the precoding matrices and the downlink channel, UE-specific demodulation RS (DRS) is used for data demodulation where the DRS symbols are precoded by the same precoding matrices applied on the data. Hence the UE is able to estimate the "effective" downlink channel—a combination of actual downlink physical channel and precoding matrices—to perform data decoding.

DRS supporting non-codebook based precoding is already specified in LTE Rel-8 for single-layer beamforming, where only a single spatial layer (e.g. data stream) is transmitted to a UE. In addition, DRS will only be present in the physical resources of downlink data transmission that is scheduled for a UE. In addition, the frequency-domain position of DRS for a UE will be offset by a cell-specific parameter, e.g. Cell-ID in Rel-8. This is to ensure randomization of the frequency domain position of the DRS symbols in different cells as to reduce inter-cell interference. Similarly, cell-specific reference signal (CRS) in Rel-8 is also offset by the cell-ID in Rel-8, as to randomize the CRS position and reduce inter-cell interference.

For CoMP joint processing, the PDSCH data to a UE is simultaneously transmitted from a set of points/eNBs in the CoMP cooperating set, as was illustrated in FIG. 1. This set of points/eNBs that are actively transmitting to a UE is known as the "CoMP transmission set".

In order to reduce the DRS overhead and assist PDSCH demodulation, DRS from different CoMP transmission points should be configured in the same time/frequency resources. In other words, the same frequency domain offset of DRS should be used at different CoMP transmission points. As a consequence, the DRS frequency domain offset configuration cannot be based on the cell-ID since this will imply a very strict restriction on the CoMP transmission sets. As an alternative, the DRS frequency offset should be based on a single parameter commonly known to all CoMP transmission points. For example, the frequency offset could be the cell-ID of a particular cell in the CoMP transmission set. Other embodiments of forming the DRS are described in U.S. patent application Ser. No. 12/690,412, filed Jan. 20, 2010, and entitled CIRCUIT AND METHOD FOR MAPPING DATA SYMBOLS AND REFERENCE SIGNALS FOR COORDINATED MULTI-POINT SYSTEMS which is incorporated in its entirety herein.

One important design criterion for DRS is that DRS position should not overlap/collide with other physical signals, such as CRS, PBCH (physical broadcast channel), SSC (Secondary Synchronization Code) and PSC (Primary Synchronization Code). For single-cell single-layer beamforming in Rel-8, this is possible since both DRS and CRS will be configured the same frequency offset (e.g. cell-ID). For CoMP transmission, however, this becomes more involved. Since the same DRS frequency offset is configured in different CoMP transmission points, it is possible that DRS will inevitably collide or interfere with CRS in a particular cell or several CoMP cells, unless the CoMP transmission points are very carefully selected. Unfortunately, this could substantially increase the network planning complexity, reduce the network flexibility in CoMP transmission set formation and rapidly degrade the CoMP gain.

Figure 4:
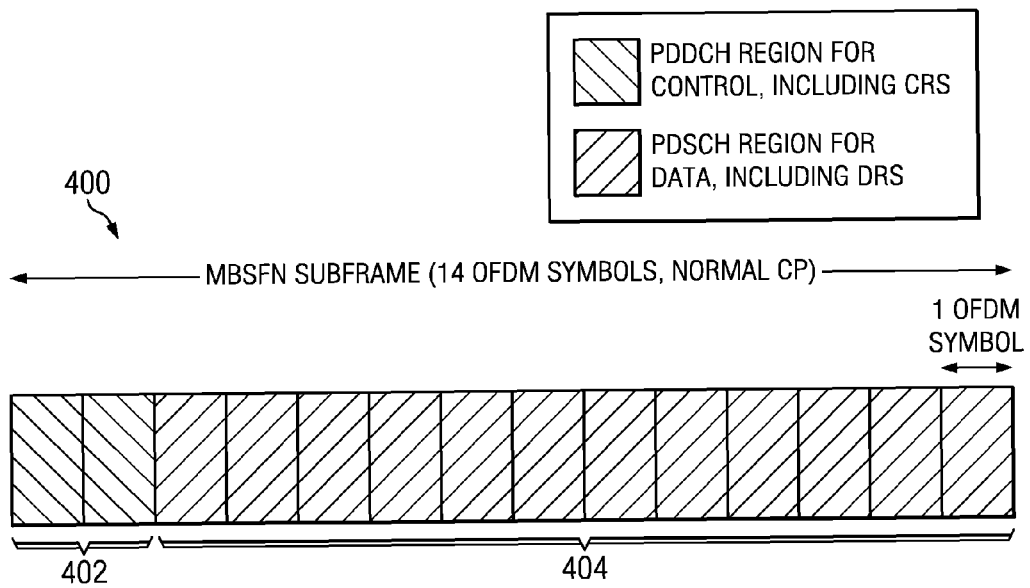
FIG. 4 is a timeline illustrating a multi-broadcast single frequency network subframe used for CoMP transmission.

FIG. 4 is a timeline illustrating a multi-broadcast single frequency network subframe 400 that may be used for CoMP transmission. Embodiments of the invention will perform CoMP transmission configured in MBSFN (multi-broadcast single frequency network) subframes. MBSFN subframes are defined in Rel-8 and Rel-9 and will be further supported in Rel-10. In an MBSFN subframe, CRS and control signal only exists in the first two OFDM symbols out of the total of 14 OFDM symbols (in normal CP) or 12 OFDM symbols (in extended CP) in a subframe. The first two OFDM symbols in a PDCCH (Physical Downlink Control Channel) portion 402 will contain Rel-8 CRS and downlink control information which the UE will receive and decode. The remaining 12/10 OFDM symbols in a PDSCH (Physical Downlink Shared Channel) portion 404, also used as the MBSFN region, will contain MCH (maintenance channel) transmission that a Rel-8 UE will ignore, and will not contain any Rel-8 CRS. Hence, no DRS/CRS collision will occur if CoMP transmission is configured in an MBSFN subframe.

Therefore, during CoMP transmission in embodiments of the invention, CRS exists in the PDCCH region 402, being the first 2 OFDM symbols of the MDSFN subframe, while DRS exists in the separate PDSCH region 404 of a MDSFN subframe, being the remaining OFDM symbols. With this guaranteed separation, no DRS/CRS conflicts will arise.

Figure 5:
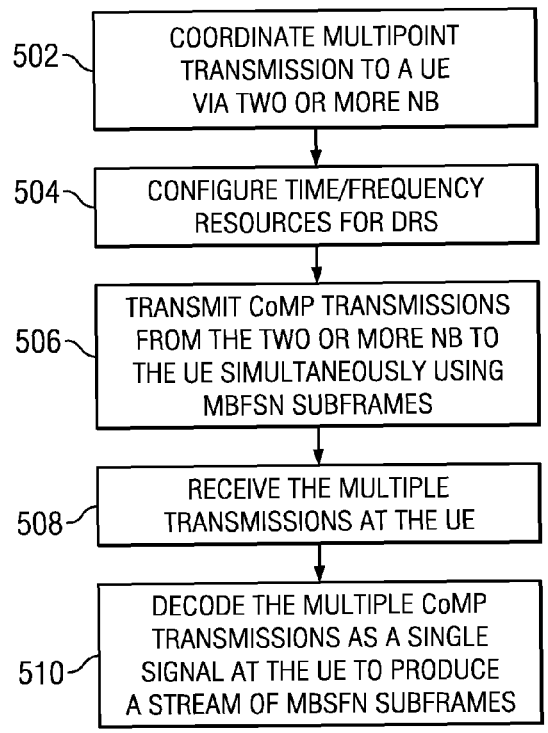
FIG. 5 is a flow diagram illustrating operation of CoMP transmission using MDSFN subframes.

FIG. 5 is a flow diagram illustrating operation of CoMP transmission using MDSFN subframes. When CoMP transmission is to be performed to one or more cell edge UE, the network manager coordinates 502 transmits to a particular UE by determining which eNB are adjacent to the cell in which the UE currently resides using signaling across the control network, according to the LTE standard. The identified NB are referred to as the CoMP cooperating cells. Time and frequency resources for the DRS are configured 504 such that the cooperating cells transmitting to the particular UE use the same time/frequency resources. CoMP transmissions to the UE are then performed simultaneously by all of the participating eNB using MBSFN subframes 506 on the Physical Multicast Channel (PMCH).

The UE then receives 508 the multiple signals transmitted simultaneously from the cooperating set of eNB of the cellular network on the same set of frequency resources. The UE decodes 510 the set of signals as a single signal which may appear to have a severe multipath delay spread. The decoding is performed using known decoding techniques to produce a stream of MBSFN subframes. As described above with reference to FIG. 4, during CoMP transmission the MBSFN subframes have a control region for containing a cell specific reference symbol (CRS) and a separate data region for containing one or more demodulation reference symbols (DRS).

Other Embodiments

While the invention has been described with reference to illustrative embodiments, this description is not intended to be construed in a limiting sense. Various other embodiments of the invention will be apparent to persons skilled in the art upon reference to this description.

Embodiments of this invention apply to various types of frequency division multiplex based transmission. Thus, the concept can easily be applied to: OFDMA, OFDM, DFT-spread OFDM, DFT-spread OFDMA, SC-OFDM, SC-OFDMA, MC-CDMA, and all other FDM-based transmission strategies.

A NodeB is generally a fixed station and may also be called a base transceiver system (BTS), an access point, or some other terminology. A UE, also commonly referred to as terminal or mobile station, may be fixed or mobile and may be a wireless device, a cellular phone, a personal digital assistant (PDA), a wireless modem card, and so on.

As described in general above, embodiment of the invention may perform all tasks described herein such as channel monitoring and precoding selection, formation of transmission signals, etc, using logic implemented by instructions executed on a processor. Another embodiment may have particular hardwired circuitry or other special purpose logic optimized for performing one or more to the tasks described herein.

An embodiment of the invention may include a system with a processor coupled to a computer readable medium in which a software program is stored that contains instructions that when executed by the processor perform the functions of modules and circuits described herein. The computer readable medium may be memory storage such as dynamic random access memory (DRAM), static RAM (SRAM), read only memory (ROM), Programmable ROM (PROM), erasable PROM (EPROM) or other similar types of memory. The computer readable media may also be in the form of magnetic, optical, semiconductor or other types of discs or other portable memory devices that can be used to distribute the software for downloading to a system for execution by a processor. The computer readable media may also be in the form of magnetic, optical, semiconductor or other types of disc unit coupled to a system that can store the software for downloading or for direct execution by a processor.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

What is claimed is:

1. A method for transmitting coordinated multi-point transmissions in a cellular network, the method comprising:
 receiving at a user equipment (UE) a plurality of signals transmitted simultaneously from a respective plurality of base stations (NB) of the cellular network, wherein each of the received plurality of signals are received on a same set of frequency resources; and
 decoding the plurality of signals as a single signal by the UE, wherein the decoding produces a stream of multi-broadcast single frequency network (MBSFN) subframes wherein at least a portion of MBSFN subframes has a control region for containing a cell specific reference symbol (CRS) and a separate data region for containing one or more demodulation reference symbols (DRS).

2. A method for transmitting coordinated multi-point transmissions in a cellular network, the method comprising:
 receiving at a user equipment (UE) a plurality of signals transmitted simultaneously from a respective plurality of base stations (NB) of the cellular network, wherein each of the received plurality of signals are received on a same set of frequency resources; and
 decoding the plurality of signals as a single signal by the UE, wherein the decoding produces a stream of multi-broadcast single frequency network (MBSFN) subframes wherein at least a portion of MBSFN subframes in a CoMP transmission to the UE from the NB and the one or more other NB has a control region for containing a cell specific reference symbol (CRS) and a separate data region for containing one or more demodulation reference symbols.

3. A device for use in a cellular network, the device comprising circuitry configured to perform a method for receiving coordinated multi-point transmissions, the method comprising:

receiving at the device a plurality of signals transmitted simultaneously from a respective plurality of base stations (NB) of the cellular network, wherein each of the received plurality of signals are received on a same set of frequency resources; and decoding the plurality of signals as a single signal by the device, wherein the decoding produces a stream of multi-broadcast single frequency network (MBSFN) subframe wherein at least a portion of MBSFN subframes has a control region for containing a cell specific reference symbol (CRS) and a separate data region for containing one or more demodulation reference symbols (DRS).

* * * * *